United States Patent
Chapa

Patent Number: 6,021,445
Date of Patent: Feb. 1, 2000

[54] REMOTE API PROCESSING METHOD USING NETWORK PROTOCOLS

[75] Inventor: Bruce E. Chapa, Anderson, S.C.

[73] Assignee: NCR Corporation, Dayton, Ohio

[21] Appl. No.: 08/221,124

[22] Filed: Mar. 30, 1994

[51] Int. Cl.$^7$ .................................................. G06F 9/44
[52] U.S. Cl. .............................................................. 709/302
[58] Field of Search ..................................... 395/650, 700

[56] References Cited

U.S. PATENT DOCUMENTS

| | | | |
|---|---|---|---|
| 5,442,791 | 8/1995 | Wrabetz et al. | 709/104 |
| 5,455,951 | 10/1995 | Bolton et al. | 709/103 |
| 5,473,777 | 12/1995 | Moeller et al. | 709/302 |

*Primary Examiner*—Tariq R. Hafiz
*Assistant Examiner*—John Q. Chavis
*Attorney, Agent, or Firm*—Paul W. Martin

[57] ABSTRACT

A remote API processing method using network protocols which allows a client terminal to off-load client application API requests to a server for processing. The method includes the steps of allocating a block of operating memory by the client terminal, placing data defining the client terminal API request in the block of operating memory by the client terminal, sending the data and instructions for creating the block of memory to the server by the client terminal, allocating a second block of operating memory like the first block of operating memory by the server using the instructions received from the client terminal, storing the data from the client terminal in the second block of operating memory by the server, processing the client terminal API request and storing API response data in the second block of memory by an API service routine executed by the server, sending the API response data, storing the API response data from the server in the first block of operating memory by the client terminal, and processing the API response data from the third block of operating memory by the application program.

6 Claims, 3 Drawing Sheets

REMOTE API PROCESSING METHOD USING NETWORK PROTOCOLS

BACKGROUND OF THE INVENTION

The present invention relates to networks including personal computers and intelligent workstations, and more specifically to a remote API processing method using network protocols.

An application primary interface (API) is a collection of commands which enable a programmer to obtain services from an application. One type of API is a command which points to a block of memory where another API request or requests are stored.

Networks typically include personal computers or intelligent workstations which are connected to a server using special software and hardware. The server may handle tasks, such as electronic mail and electronic faxing for the network.

Personal computers and intelligent workstations have limited memory resources. For example, personal computers that include Intel-compatible processors suffer from a conventional memory ceiling of 640 KBytes. When such personal computers employ a Microsoft-compatible Disk Operating System (DOS), the conventional memory must be shared by the operating system, the local area network (LAN) software, the wide area network (WAN) software, and the end user applications.

In a retail environment, the personal computers or terminals may also not be equipped or capable of being equipped with enough extended memory. Such personal computers are not capable of executing applications that require large amounts of extended memory.

The traditional network answer to the limited resources of a client terminal has been "work sharing" in which a server and a client terminal share processing tasks for network-based applications.

Therefore, it would be desirable to provide a method for networking client terminals in which memory-intensive client tasks, such as API requests, are off-loaded to a server.

SUMMARY OF THE INVENTION

In accordance with the teachings of the present invention, a remote API processing method using network protocols is provided. The remote API processing method allows a client terminal to off-load API requests generated by an application program to a server. The method includes the steps of allocating a block of operating memory by the client terminal, placing data defining the client terminal API request in the block of operating memory by the client terminal, sending the data and instructions for creating the block of memory to the server by the client terminal, allocating a second block of operating memory like the first block of operating memory by the server using the instructions received from the client terminal, storing the data from the client terminal in the second block of operating memory by the server, processing the client terminal API request and storing API response data in the second block of memory by an API service routine executed by the server, sending the API response data to the client terminal by the server, storing the API response data from the server in the first block of operating memory by the client terminal, and processing the API response data from the first block of operating memory by the application program.

It is accordingly an object of the present invention to provide a remote API processing method using network protocols.

It is another object of the present invention to provide a remote API processing method using network protocols which allows a client terminal to off-load API requests generated by an application program to a server.

It is another object of the present invention to provide a remote API processing method using network protocols that can easily be ported from one operating system to another.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
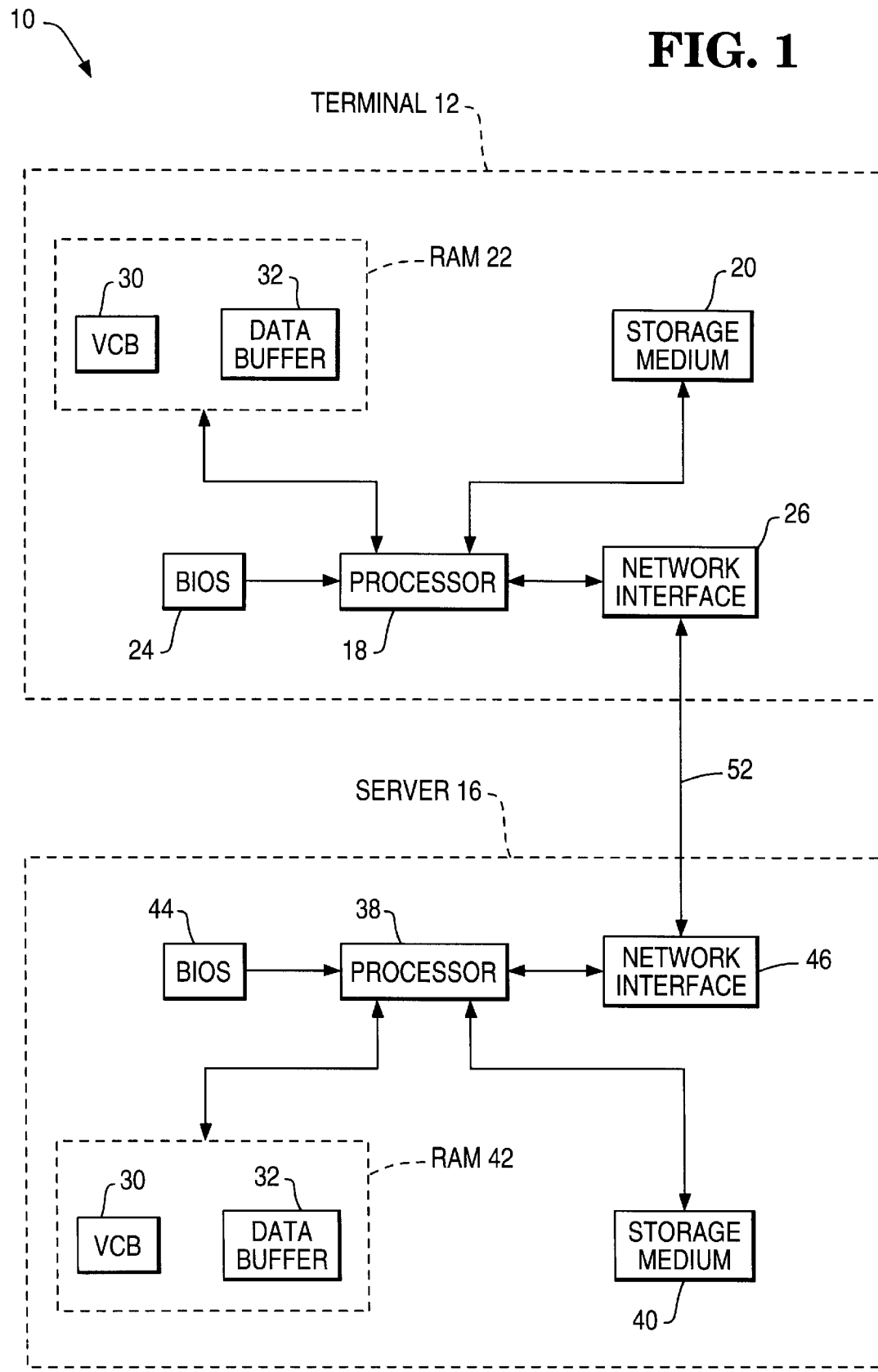
FIG. 1 is a block diagram of a network containing a plurality of personal computers.

Referring now to FIG. 1, network system 10 includes client terminal 12 and server 16. System 10 preferably includes additional client terminals and may include additional servers as part of a local area network (LAN) or a wide area network (WAN).

Terminal 12 includes processor 18, storage medium 20, RAM 22, BIOS 24, and network interface 26.

Processor 18 executes control software and application software. Control software includes an operating system, system drivers, and system utilities. Application software may be a local application or any application that is suited for network operation, such as a communications application or a retail application.

Storage medium 20 may be a hard disk or floppy disk.

RAM 22 stores code and data segments during execution of software by processor 18. RAM 22 preferably includes any combination of conventional memory and extended memory. For Intel-compatible processor-based systems, RAM 22 preferably includes 640 KBytes of conventional memory.

More importantly, RAM 22 contains a verb control block (VCB) 30 and a data buffer 32, which provide the ability to off-load tasks from client terminal 12 to server 16. Under the C programming language, VCB 30 is a structure that occupies a physical location in RAM 22. VCB 30 is formatted by the API being used.

VCB 30 is created by allocating a block of memory from RAM 22 in a means consistent with the environment of the application. In the C programming language, this would be done using the "malloc(size)" C Library command which returns a block of memory of at least "size" bytes. Once the block of memory is allocated, data is placed in VCB 30 at predefined offsets.

BIOS 24 provides low-level instructions which allow processor 18 to initiate loading and execution of software. Preferably, BIOS 24 is stored in a ROM chip.

Network interface 26 includes standard hardware and software for establishing communications with server 16. Network interface 26 treats VCB 30 as it would any other information. Alteration of network software is not required.

Server 16 includes components similar to terminal 12, such as processor 38, storage medium 40, RAM 42, BIOS 44, and network interface 46.

Process or 38 executes control software and application software. Control software includes a network operating system, system drivers, and system utilities.

Storage medium 40 stores control software and application software. Storage medium 40 is preferably a hard disk or an array of hard disks.

RAM 42 contains clones of VCB 30 and data buffer 32, which allow server 16 to perform tasks for client terminal 12.

Terminal 12 may be connected to server 16 through cable 52 or through a wireless network connection.

Figure 2:
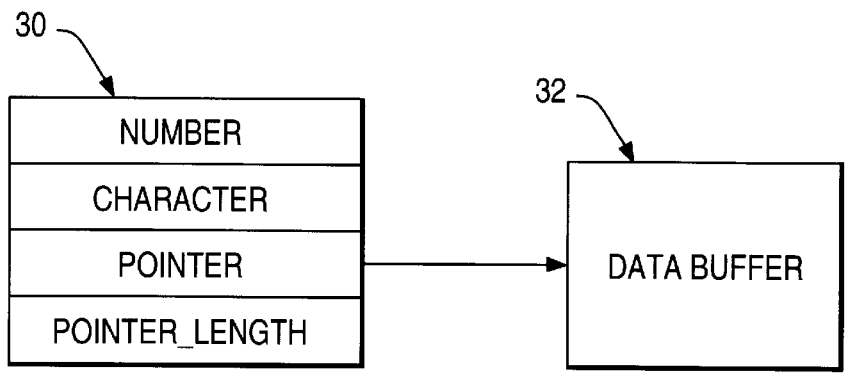
FIG. 2 is a block diagram of a verb control block and data buffer used in the method of the present invention.

Turning now to FIG. 2, an example of VCB 30 is shown and is defined by the following structure:

```
struct{
    int     number;
    char    character;
    char    far * pointer;
    int     pointer_length
}
```

Since VCB 30 is of known length, it is possible to create a "clone" of VCB 30 and any data buffers within server 16. Once the clone of VCB 30 and the data buffers to which it points are established within server 16, server 16 can process the API request within VCB 30. The response to the request within VCB 30 is returned in the same memory that the original request used.

Figure 3:
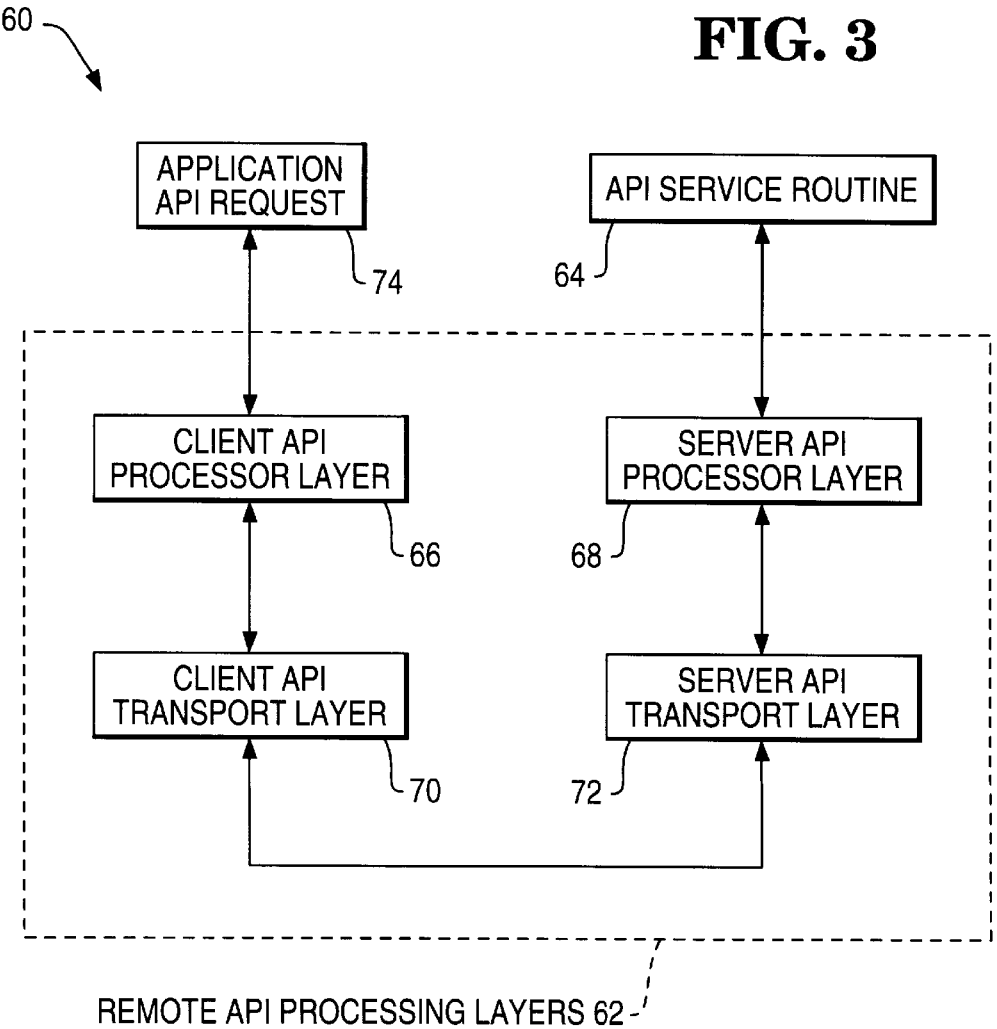
FIG. 3 is a block diagram of the software architecture associated with the method of the present invention.

Turning now to FIG. 3, a block diagram of the software architecture 60 which allows API requests to be transported from terminal 12 to server 16 and from server 16 back to client terminal 12 is shown. Software architecture 60 includes remote API processing layers 62 and API service routine 64.

Remote API processing layers 62 include client API processing layer 66, server API processing layer 68, client API transport layer 70, and server API transport layer 72.

Client API processing layer 66 accepts an API request from application software 74, encapsulates the API request, and passes the encapsulated request to client API transport layer 70 for transport to server 16. Client API processing layer 66 also accepts a response from client transport layer 70 to the request, encapsulates the response, and provides it to application software 74.

Client and server API transport layers 70 and 72 transport API requests and responses in accordance with network independent or network dependent protocols. Network independent protocols may include Named Pipes or Mailslots. Network dependent protocols may include NETBIOS, TCP/IP, SPX/IPX.

Server API processing layer 68 accepts the API request from server transport layer 72 and passes it to API service routine 64 in accordance with the application calling conventions in use. Server API processing layer 68 accepts a response from API service routine 64, encapsulates the response, and passes it to server API transport layer 72

API service routine 64 processes the API request from application software 74 and returns a response to application software 74 through layers 66–72.

Software architecture 60 is largely independent of the network software. From the network's point of view, the software architecture 60 is just another application. API transport layers 70 and 72 are dependent on the network software and must be developed for the type of network transport they will use (NETBIOS, Named Pipes, Sockets, etc.)

Advantageously, software architecture 60 provides the flexibility of interchanging transport layers with API processor layers. With API processing layers 66 and 68 separated from API transport layers 70 and 72, software from one network operating system may be easily ported to a different network operating system.

Figure 4:
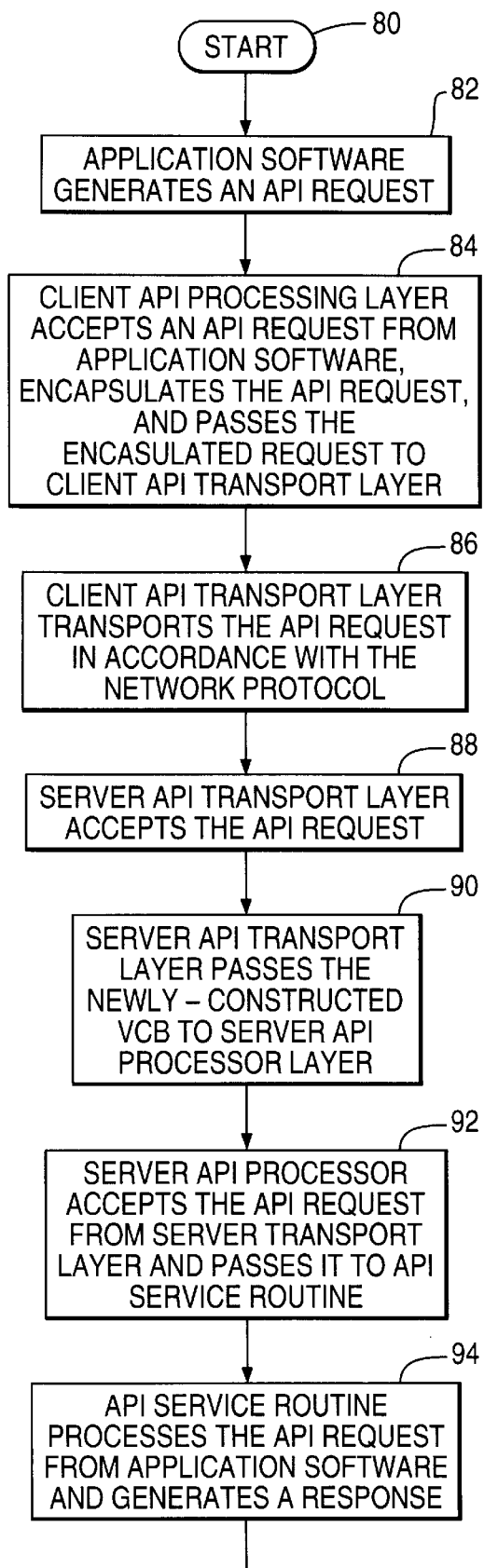
FIG. 4 is a flow diagram of the method of the present invention.
Figure 4:
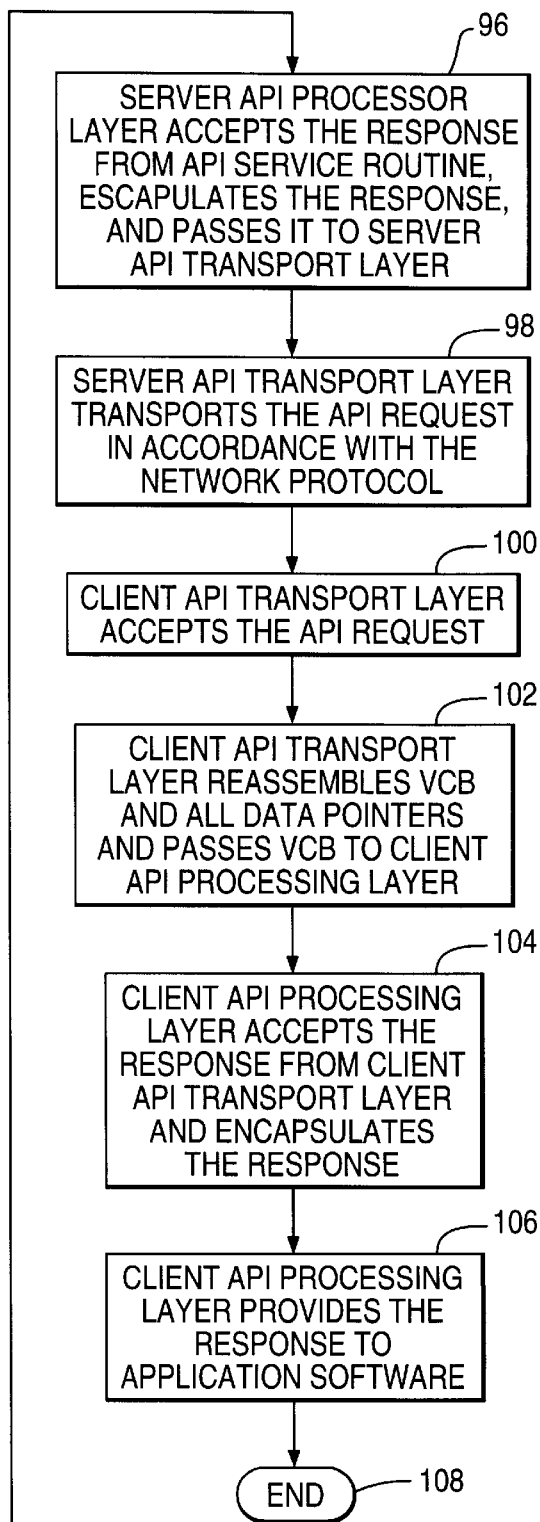

Referring now to FIG. 4, the method of the present invention begins with START 80.

In step 82, application software 74 generates an API request.

In step 84, client API processing layer 66 accepts an API request from application software 74, encapsulates the API request, and passes the encapsulated request to client API transport layer 70.

Since client API transport layer 70 has no knowledge of the format of VCB 30, client API processor layer must provide layer 70 with information such as the location and size of VCB 30, the locations within VCB 30 of pointers to data buffer 32, and the length of data buffer 32.

This information can be provided by whatever means is most efficient for the operating system in use by client terminal 12. As an example, for a client terminal which is a personal computer running the Microsoft Disk Operating System (MSDOS), the C programming language may be used to pass the information to client API transport layer 70 as part of a call using a variable length parameter list. The C programming language allows a programmer to place as many parameters in the call as necessary. The following is an example of a possible format of the call:

Remote_API_Tansport_Layer(*VCB, LEN_VCB, NUM_BUFFERS, BUFFER1, LEN_BUFFER1 , . . . );

where:

*VCB is the pointer to VCB 30 to be transported to server 16,

LEN_VCB is the length of VCB 30,

NUM_BUFFERS is the number of buffer pointers in VCB 30,

BUFFER1 is the offset into VCB 30 of the first pointer, and

LEN_BUFFER1 is the length of the first buffer.

In step 86, client API transport layer 70 transports the API request in accordance with the network protocol.

In step 88, server API transport layer 72 accepts the API request.

An example illustrating the operation of transport layers 70 and 72 is shown below and is based upon the following block of information being transferred from client API processor layer 66 to client API transport layer 70:

VCB Address=Location A

Length of VCB=20 bytes

Number of Buffers=1

Offset of Buffer 1=10

Length of Buffer 1=45 bytes

Client API transport layer 70 passes to server API transport layer 72 the length of VCB 30 (20 bytes), the number of data buffers 32 (1), the offset into VCB 30 that contains the pointer to data buffer 32 (10), the length of data buffer 32, and the contents of data buffer 32 (45 bytes).

Server API transport layer 72 receives an indication from the network software that a 20-byte VCB is coming and allocates 20 bytes of RAM 42 for VCB 30 and reads VCB 30 into that allocated memory. It then reads that there is one data buffer of length 45 bytes that is at offset ten into VCB 30. It allocates a data buffer 32 of 45 bytes, places the address of data buffer 32 into VCB 30 at offset ten, and reads the data for data buffer 32 into the allocated buffer memory.

In step 90, server API transport layer 72 passes the newly-constructed VCB 30 to server API processor layer 68.

In step 92, server API processor layer 68 accepts the API request from server transport layer 72 and passes it to API service routine 64 in accordance with the application calling conventions in use.

In step 94, API service routine 64 processes the API request from application software 74 and generates a response.

In step 96, server API processor layer 68 accepts the response from API service routine 64, encapsulates the response, and passes it to server API transport layer 72 in the same manner as client API processor layer 66 passed VCB 30 to client API transport layer 70.

The mechanisms and processes for returning a response for the request are similar to the process for sending a request, except that on the server side, once the information has been transmitted, the memory can be de-allocated. On the client side, VCB 30 and the contents of data buffer 32 are read into the areas supplied by the original call.

In step 98, server API transport layer 72 transports the API request in accordance with the network protocol.

In step 100, client API transport layer 70 accepts the API request.

In step 102, client API transport layer 70 uses the block of information coming over the network to reassemble VCB 30 and all data pointers, placing the data into the memory provided by the original call. The updated VCB 30 is then passed to client API processing layer 64.

In step 104, client API processing layer 66 accepts the response from client API transport layer 70 and encapsulates the response.

In step 106, client API processing layer 66 provides the response to application software 74.

In step 108, the method ends.

Although the present invention has been described with particular reference to certain preferred embodiments thereof, variations and modifications of the present invention can be effected within the spirit and scope of the following claims.

What is claimed is:

1. A method for processing an API request generated by an application program that is executing in a client terminal by a server computer networked to the client terminal comprising the steps of:

(a) allocating a block of operating memory by the client terminal;

(b) placing data defining the client terminal API request in the block of operating memory by the client terminal;

(c) sending the data and instructions for creating the block of memory to the server computer by the client terminal;

(d) allocating a second block of operating memory like the first block of operating memory by the server computer using the instructions received from the client terminal;

(e) storing the data from the client terminal in the second block of operating memory by the server computer;

(f) processing the client terminal API request and storing API response data in the second block of memory by an API service routine executed by the server computer;

(g) sending the API response data and instructions for creating the second block of memory to the client terminal by the server computer;

(h) storing the API response data from the server computer in the one block of operating memory by the client terminal; and (i) processing the API response data from the one block of operating memory by the application program.

2. The method as recited in claim 1, wherein step (a) comprises the substeps of:

(a-1) providing at least a first data buffer having an offset and a length; and (a-2) defining a sub-block of operating memory which points to the data buffer and which contains the length of the sub-block, the number of buffers, the offset of the first buffer, and the length of the first buffer.

3. The method as recited in claim 2, wherein step (c) comprises the substeps of:

(c-1) executing a network operating system by the client terminal and server computer;

(c-2) executing a first API transport routine by the client terminal;

(c-3) executing a second API transport routine by the server computer;

(c-4) passing the information within the sub-block of operating memory and the data buffer to the network operating system by the first transport layer;

(c-5) passing the information to the second API transport layer by the network operating system; and (c-6) passing the information to the API service routine by the second API transport layer.

4. The method as recited in claim 1, wherein step (d) comprises the substeps of:

(d-1) providing at least a first data buffer having an offset and a length; and (d-2) defining a sub-block of operating memory which points to the data buffer and which contains the length of the sub-block, the number of buffers, the offset of the first buffer, and the length of the first buffer.

5. The method as recited in claim 4, wherein step (g) comprises the substeps of:

(g-1) executing a network operating system by the client terminal and server computer;

(g-2) executing a first API transport routine by the client terminal;

(g-3) executing a second API transport routine by the server computer;

(g-4) passing the information within the sub-block of operating memory and the API response data within the data buffer to the network operating system by the second transport layer;

(g-5) passing the information and the API response data to the first API transport layer by the network operating system; and (g-6) passing the information to the application program by the second API transport layer.

6. A method for processing an API request generated by an application program that is executing in a first computer by a second computer networked to the first computer comprising the steps of:

(a) allocating a block of operating memory by the first computer;

(b) placing data defining the first computer API request in the block of operating memory by the first computer;

(c) sending the data and instructions for creating the block of memory to the second computer by the first computer;

(d) allocating a second block of operating memory like the first block of operating memory by the second computer using the instructions received from the first computer;

(e) storing the data from the first computer in the second block of operating memory by the second computer;

(f) processing the first computer API request and storing API response data in the second block of memory by an API service routine executed by the second computer;

(g) sending the API response data and instructions for creating the second block of memory to the first computer by the second computer;

(h) storing the API response data from the second computer in the one block of operating memory by the first computer; and (i) processing the API response data from the one block of operating memory by the application program.

* * * * *